Patented Aug. 24, 1948

2,447,813

UNITED STATES PATENT OFFICE 2,447,813

RESINOUS INTERPOLYMER CONTAINING 1,2-DICYANO-1-PHENYLETHYLENE

David T. Mowry, Dayton, Ohio, assignor to Monsanto Chemical Company, St. Louis, Mo., a corporation of Delaware No Drawing. Application July 24, 1944, Serial No. 546,434

5 Claims. (Cl. 260—78.5)

The present invention relates to the production of copolymerization (e. g., co- or interpolymerization) products.

An object of the present invention is to provide copolymerization products of $CH_2 : C<$ substituted aromatic hydrocarbons such as styrene, alpha-methylstyrene and alpha,para-dimethylstyrene, together with 1,2-dicyano-1-phenylethylene, which products have improved physical strength characteristics, as well as a higher thermal stability (heat distortion point) than does the polymerized vinyl aromatic hydrocarbon itself.

I have found that valuable interpolymerization products may be obtained by polymerizing a mixture containing 1,2 - dicyano - 1 - phenylethylene and a $CH_2=C<$ substituted aromatic hydrocarbon such as styrene, alpha-methylstyrene or alpha, para-dimethylstyrene. If desired, mixtures of the latter three $CH_2=C<$ substituted aromatic hydrocarbons may also be employed.

1,2-dicyano-1-phenylethylene may be prepared as follows:

Phenyl succinonitrile (prepared according to the method of Gitsels and Wibaut, Rec. trav. chim. 59, 1093–1103 (1940) is treated with a chlorinating agent such as sulfuryl chloride. When the evolution of HCl gas has ceased the product is recovered in good yield from the residue by distillation under high vacuum. It may be further purified by crystallization from dilute alcohol if desired.

Polymerization of the above-mentioned compounds to form interpolymers may be carried out by merely heating a mixture of the nitrile and the $CH_2=C<$ substituted aromatic hydrocarbon in mass, in solution or in emulsion. The temperature of polymerization may range from 50° C. to 120° C., although in some cases higher temperatures may be satisfactorily employed.

When carrying out a mass polymerization of the above-mentioned ingredients, a mixture is first prepared by dissolving the nitrile in the liquid monomeric $CH_2=C<$ substituted aromatic hydrocarbon and the mixture then subjected to polymerizing conditions by the application of heat either in the absence of or in the presence of a polymerization catalyst. The latter may be benzoyl peroxide, acetyl peroxide or any other of the known catalysts of polymerization. For most satisfactory operation the mixture should contain from 0.5% to 50% by weight of the dinitrile, although interpolymerization will occur even with greater amounts of dinitrile present, the excess of dinitrile being readily recoverable in unpolymerized form.

The amount of 1,2-dicyano-1-phenylethylene combined as interpolymer may vary from 1% to 50% by weight of the interpolymer, the amount used being dependent upon the physical characteristics of the interpolymer desired. In general, it may be said that the greater the amount of nitrile employed, the higher will be the thermal softening point or heat distortion point.

1,2-dicyano-1-phenylethylene is selective in respect to its copolymerizing properties. It exhibits no tendency to interpolymerize with a great many vinyl compounds such as vinyl chloride, vinyl esters such as vinyl acetate or vinyl ethers.

The present interpolymers may be readily obtained in a clear, transparent and chemically stable form. The present products may be employed for the production of transparent objects such as interlayers for safety glass or the like, or for the manufacture of transparent, molded articles for electrical insulating materials, etc.

The present interpolymers are, moreover, characterized by good resistance to chemical reagents, excellent thermal stability and improved resistance to impact. In general, the copolymerization of styrene with 1,2-dicyano-1-phenylethylene in the proportions so as to yield from, say, 5% to 35% by weight of the copolymerized 1,2-dicyano-1-phenylethylene in the interpolymer results in the production of resinous products having an impact resistance which is substantially greater than that of polystyrene.

I may also employ the polymerization process disclosed in the copending application of Reid G. Fordyce, Serial No. 503,941, filed September 27, 1943, now abandoned, which application is assigned to the same assignee as the present application.

For the production of clear, transparent, resinous products derived from monomeric styrene, I may employ mixtures of monomeric styrene and 1,2-dicyano-1-phenylethylene, in which mixtures the nitrile content is below approximately 50% by weight and preferably below 35% by weight of said mixture. During polymerization by mass or solution methods, and depending upon the relative proportions of the dinitrile and $CH_2=C<$ substituted aromatic hydrocarbon present in the mixture undergoing polymerization, one of the constituents thereof will enter the growing polymer chain at a greater rate than the other constituent. It may, accordingly, be desirable during polymerization to maintain constant the concentration of the constituent which enters the copolymer at the highest rate. This may be done, as described in the above-mentioned application, Serial No. 503,941, by a determination of the concentration of the respective monomers and copolymer present, and then adjusting the concentration of the monomeric mixture to that originally present in the mixture.

The polymerization of mixtures of the CH$_2$=C< substituted aromatic hydrocarbon with the dinitrile, if desired, may be carried to completion, i. e., carried to the stage where a hard, solid, resinous material is obtained which is substantially free from monomeric material. Such a method is useful when producing cast objects. For most purposes, however, the polymerization is generally carried to a degree which is short of complete polymerization and the interpolymer thereafter recovered by solution in a solvent such as benzol or dioxane, which solution is then poured into a lower aliphatic alcohol wherein the interpolymer is insoluble and in which the unpolymerized monomeric materials are soluble. Such a procedure results in the production of a finely divided powdery to fibrous, colorless to slightly yellowish material which may be washed free of adhering monomeric materials and solvent, dried and which then is suitable for use as a molding material.

The invention is further illustrated by means of the following examples which are given for the purposes of illustration and are not to be considered as limitations upon the present invention.

Example 1

A mixture consisting of 70 parts of monomeric styrene and 30 parts of 1,2-dicyano-1-phenylethylene is made by dissolving the latter in the styrene and then heating the mixture in the presence of 1% benzoyl peroxide as polymerizing catalyst at a temperature of 65° C. for 20 days. The product is a hard, clear resin of high impact strength and thermal stability. If it is desired to remove any small amount of unpolymerized monomeric materials which may be present, the resin may be dissolved in dioxane to form a solution thereof and the solution then poured into methyl alcohol. The interpolymer will be recovered in the form of a white, somewhat fibrous, solid material. The powdery material is then molded by compression molding in a heated die, and will be found to have an ASTM heat distortion point substantially higher than that of polystyrene.

In place of styrene, alpha-methylstyrene or alpha, para-dimethylstyrene or mixtures thereof, with styrene, may be employed.

Example 2

A monomeric mixture of styrene and 1,2-dicyano-1-phenylethylene, said mixture containing approximately 2.5% of the dinitrile is polymerized by heating in the presence of a polymerization catalyst to a temperature of 50° C. to 60° C. with stirring. During the polymerization, samples of the mixture may be withdrawn and the content of copolymer in the mixture determined by precipitation in alcohol. The content of the dinitrile in the polymer may be determined by analysis of its nitrogen content. Based upon the analysis the amount and composition of the copolymer may be determined as well as the concentration of the dinitrile in the monomeric mixture. As a result of such an analysis the amount of interpolymer present, as well as the composition of the interpolymer and the monomeric mixture containing the same, may be determined. Based upon such a determination conducted at frequent intervals during polymerization, the monomeric mixture may be adjusted to that originally present and the composition of the copolymer with respect to dinitrile maintained at a substantially constant value throughout the polymerization.

When polymerizations are carried out as above-described, i. e., in the absence of a solvent, the degree of polymerization may be carried to the point where the mixture contains between, say, 20% and 30% by weight of the interpolymer. At this point the viscosity ordinarily becomes too high for the maintenance of uniformity and the polymerization may be interrupted and the interpolymer recovered by solution in a solvent followed by precipitation by addition of the mixture to alcohol.

If desired, the polymerization may be carried out in solution in a solvent such as benzol or dioxane, in which case the polymerization may be carried to a greater content of copolymer than was possible in the absence of the solvent. By the use of suitable amounts of solvent, the extent of polymerization may be carried to 60% to 70% of completion. The polymeric material is recovered by precipitation in alcohol. In this manner, moldable interpolymer, which is clear and homogeneous may be obtained.

The behavior towards solvents of the resinous interpolymer depends upon the amount of copolymerized 1,2-dicyano-1-phenylethylene contained therein. In general, increasing the amount of 1,2-dicyano-1-phenylethylene in the interpolymer increases its resistance to solvents.

The interpolymerization of the CH$_2$=C< substituted aromatic compound and 1,2-dicyano-1-phenylethylene may also be carried out in the presence of plasticizers and plasticized resinous bodies obtained.

Example 3

A mixture comprising 70 g. of styrene, 30 g. of 1,2-dicyano-1-phenylethylene and 30 g. of butyl phthalyl butyl glycollate is polymerized by heating at a temperature of 80° C. for 15 days and then at 120° C. for one day. The resulting hard, clear resin is ground to a powder and then milled on heated rolls. If desired, coloring matter may be added, while milling. The milled material is then reduced to a powder and may be molded in heated dies for the production of various objects.

Various other proportions of a CH$_2$=C< substituted aromatic compound and 1,2-dicyano-1-phenylethylene may also be employed in the presence of plasticizers. Other plasticizers such as tricresyl or triphenyl phosphate may be employed in a similar manner.

Example 4

A mixture consisting of 85 g. of monomeric styrene and 15 g. 1,2-dicyano-1-phenylethylene is emulsified to a fine milk in 120 g. of water containing 3.0 g. of disodium phosphate, 0.8 g. of citric acid and 0.04 g. of potassium persulfate and also containing 12.5 g. of sodium lorol sulfate as an emulsifying agent. The pH of the emulsion is about 5.0. The emulsion is polymerized by refluxing (boiling under a reflux condenser for 15 minutes). The emulsion is then broken by pouring into methyl alcohol and the precipitated polymer is filtered, washed with alcohol and water and then dried. Alternatively the emulsion may be broken by adding a solution of an electrolyte.

The dried, finely divided polymer, containing approximately 15% by weight of 1,2-dicyano-1-phenylethylene, may then be used directly as a molding powder, or it may be milled on heated rolls, the sheet thus obtained comminuted and employed in molding operations.

The herein-described interpolymers are resistant to acids and alkalies, i. e., there is no tendency of the nitrile groups in the interpolymer to hydrolyze. The present products are insoluble in dilute or concentrated acids and in dilute or concentrated aqueous alkalies. They are free from carboxy groups and also salt groups.

This application is a continuation-in-part of my copending application Serial No. 450,514, filed July 11, 1942, now abandoned.

What I claim is:

1. The process which comprises forming a polymerizable mixture consisting of a $CH_2$:C< substituted aromatic hydrocarbon selected from the group consisting of styrene, alpha-methylstyrene and alpha,paradimethylstyrene, together with 1,2-dicyano-1-phenylethylene, said mixture containing between 0.5% and 50% by weight of said 1,2-dicyano-1-phenylethylene and then heating said mixture to a polymerizing temperature to form an interpolymer.

2. The process which comprises forming a mixture consisting of styrene and 1,2-dicyano-1-phenylethylene the latter comprising from 0.5% to 50% by weight of said mixture, and then heating said mixture to a polymerizing temperature to form an interpolymer.

3. A resinous material comprising an interpolymer of styrene and 1,2-dicyano-1-phenylethylene, said interpolymer containing between 5.0% and 35% of copolymerized 1,2-dicyano-1-phenylethylene the balance thereof being copolymerized styrene.

4. A resinous material comprising an interpolymer of styrene and 1,2-dicyano-1-phenylethylene, said interpolymer containing 15% of copolymerized 1,2-dicyano-1-phenylethylene the balance thereof being copolymerized styrene.

5. A resinous material comprising an interpolymer consisting of a $CH_2$=C< substituted aromatic hydrocarbon selected from the group consisting of styrene, alpha-methylstyrene and alpha,para-dimethylstyrene copolymerized with 1,2-dicyano-1-phenylethylene, said interpolymer containing between 1.0% and 50% of copolymerized 1,2-dicyano-1-phenylethylene.

DAVID T. MOWRY.

REFERENCES CITED

The following references are of record in the file of this patent:

UNITED STATES PATENTS

| Number | Name | Date |
|---|---|---|
| 1,683,402 | Ostromislensky | Sept. 4, 1928 |
| 2,047,398 | Voss et al | July 14, 1936 |
| 2,321,422 | Robie | June 8, 1943 |

FOREIGN PATENTS

| Number | Country | Date |
|---|---|---|
| 814,093 | France | Mar. 8, 1937 |